US008850192B2

(12) United States Patent
Choi et al.

(10) Patent No.: US 8,850,192 B2
(45) Date of Patent: *Sep. 30, 2014

(54) APPARATUS AND METHOD FOR USING CONTENTS INFORMATION IN DIGITAL RIGHTS MANAGEMENT (71) Applicant: Samsung Electronics Co., Ltd, Gyeonggi-do (KR)

(72) Inventors: Seong Choi, Seoul (KR); Jung-Hun Park, Gyeonggi-do (KR); Yun-Sang Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,473

(22) Filed: Nov. 26, 2012

(65) Prior Publication Data
US 2013/0111601 A1    May 2, 2013

Related U.S. Application Data (63) Continuation of application No. 12/583,293, filed on Aug. 18, 2009, now Pat. No. 8,321,665.

(30) Foreign Application Priority Data

Aug. 21, 2008  (KR) .................. 10-2008-0082079
Mar. 30, 2009  (KR) .................. 10-2009-0026818

(51) Int. Cl.
H04L 29/06    (2006.01)
G06F 21/10    (2013.01)
G06F 21/60    (2013.01)

(52) U.S. Cl.
CPC .............. G06F 21/60 (2013.01); G06F 21/10 (2013.01)
USPC ............................................ 713/159; 726/26

(58) Field of Classification Search
CPC .............. H04L 63/0823; H04L 9/3281; H04L 63/0428; G06Q 21/34
See application file for complete search history.

(56) References Cited

U.S. PATENT DOCUMENTS 7,877,598 B2 *  1/2011  Schmidt et al. ............... 713/154
2005/0044361 A1  2/2005  Chang et al.
(Continued)

FOREIGN PATENT DOCUMENTS

JP      2002-353952    12/2002
KR   10-2006-0128869    12/2006
KR      10-0807467     2/2008

OTHER PUBLICATIONS

International Search Report and Written Opinion of International Searching Authority dated Apr. 7, 2010 in connection with International Patent Application No. PCT/KR2009/004679.

Primary Examiner — Kambiz Zand
Assistant Examiner — Ghodrat Jamshidi (57) ABSTRACT An apparatus and method for determining contents information corresponding to a Rights Object (RO) by transmitting information on contents together when the RO is moved from a mobile device to a memory card or a smart card or when the RO is moved from the memory card or the smart card to the mobile device are provided. The apparatus includes a meta information manager for determining information on contents corresponding to the RO when the RO is moved, and for generating meta information containing the determined contents information, and a controller for providing control to transmit the RO and the meta information generated by the meta information manager to a portable storage device. Accordingly, the conventional problem can be solved in which information on contents cannot be determined by using a Contents IDentifier (CID) if the RO does not exist together with the contents.

20 Claims, 10 Drawing Sheets

(56) References Cited

U.S. PATENT DOCUMENTS

| | | | |
|---|---|---|---|
| 2005/0268346 A1* | 12/2005 | Lee et al. ........................ 726/27 |
| 2007/0038576 A1* | 2/2007 | Lee ................................. 705/59 |
| 2007/0157318 A1 | 7/2007 | Lee et al. |
| 2008/0114687 A1* | 5/2008 | Watanabe et al. ............... 705/51 |

* cited by examiner

FIG.10 ns in an SRM agent.

APPARATUS AND METHOD FOR USING CONTENTS INFORMATION IN DIGITAL RIGHTS MANAGEMENT

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 21, 2008 and assigned Serial No. 10-2008-0082079 and a Korean patent application filed in the Korean Intellectual Property Office on Mar. 30, 2009 and assigned Serial No. 10-2009-0026818 the entire disclosure of both of which are hereby incorporated by reference. The present application is also a continuation of U.S. patent application Ser. No. 12/583,293, filed on Aug. 18, 2009.

TECHNICAL FIELD OF THE INVENTION

The present invention relates to determining contents information corresponding to a Rights Object (RO) by transmitting information on contents together when the RO is moved from a mobile device to a memory card or a smart card or when the RO is moved from the memory card or the smart card to the mobile device, and also relates to moving rights used in an Open Mobile Alliance (OMA) Digital Rights Management (DRM)/Secure Removable Media (SRM). More particularly, the present invention relates to an apparatus and method for storing rights information in an SRM agent, and for accessing an object corresponding to the rights information when the SRM agent is installed in another device.

BACKGROUND OF THE INVENTION

Digital Rights Management (DRM) is a technique for avoiding illegal distribution and copying of digital contents so that only legitimate users can use the contents, and for managing rights of digital contents by using an accounting service or the like.

Open Mobile Alliance (OMA) DRM widely used as a de factor standard of the DRM technique is currently being standardized by an OMA international standard organization. A standard document of the OMA DRM technique contains technical descriptions regarding encryption of contents and reliable transmission to a device such as a portable terminal by packaging a key used for encryption in a format of a Rights Object (RO). Since the release of the OMA DRM version 1.0 in 2002, the OMA DRM version 2.0 was released in 2006, followed by the OMA DRM version 2.1 in 2007. The Secure Removable Media (SRM) technical standard version 1.0 was released in 2008, and in this standard, the DRM technique can be extended to an external memory (e.g., a memory card, a smart card, etc.) in addition to a portable phone. Examples of functions provided in the SRM 1.0 extended from the OMA DRM 2.0 include a function of moving an RO from a mobile device to a memory card or a smart card (i.e., Device to SRM Move), a function of moving the RO from the memory card or the smart card to the mobile device (i.e., SRM to Device Move), and a function of consuming the RO stored in the memory card or the smart card to reproduce contents by the device (i.e., Local Rights Consumption).

In the OMA DRM 2.0 and its subsequent versions, a contents encryption key is managed using a Public Key Infrastructure (PKI) scheme. The PKI scheme uses secure asymmetric key encryption such as a Rivest-Shamir-Adleman (RSA) encryption algorithm and is recognized as a very secure key management system. Disadvantageously, however, the PKI scheme is not managed by a strongly reliable organization. Therefore, there is a need for a system in which a key is issued and managed by a strongly reliable organization (e.g., a governmental organization).

The OMA DRM 2.0 provides various functions, for example, protocol messaging for delivering an RO from a service/contents provider to a device, protection of a contents encryption key and packaging of the RO, contents encryption and packaging, sharing of the RO between devices, etc.

In general, the RO contains a Contents IDentifier (CID) as contents information so as to manage the RO on a contents basis.

When the RO contains only the CID as the contents information, if the RO does not exist together with corresponding contents, that is, if only the RO is moved to another storage medium, a problem arises in that information on the contents cannot be determined using the CID.

Further, there is another problem in that an access path of contents or its equivalent information does not exist in information related to the RO.

Accordingly, to solve the aforementioned problems, there is a need for an apparatus and method for transmitting additional information on the contents together with the transmission of an RO.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for determining contents information corresponding to a Rights Object (RO) in a mobile device.

Another aspect of the present invention is to provide an apparatus and method for transmitting information on contents together when an RO is moved from a mobile device to a memory card or a smart card or when the RO is moved from the memory card or the smart card to the mobile device.

Another aspect of the present invention is to provide an apparatus and method for generating meta information containing information on contents by using a Contents IDentifier (CID) corresponding to an RO in a mobile device.

Another aspect of the present invention is to provide an apparatus and method for moving an RO.

Another aspect of the present invention is to provide an apparatus and method capable of obtaining information on contents by using only rights information independent from the contents by adding contents related information to the rights information currently in use.

In accordance with an aspect of the present invention, an apparatus for providing contents information when an RO is transmitted is provided. The apparatus includes a meta information manager for determining information on contents corresponding to the RO when the RO is moved, and for generating meta information containing the determined contents information, and a controller for controlling a transmission of the RO and the meta information generated by the meta information manager to a portable storage device.

In accordance with another aspect of the present invention, a method of providing contents information when an RO is transmitted by a portable device is provided. The method includes determining information on contents corresponding to the RO when the RO is moved, generating meta information containing the determined contents information, and transmitting the RO and the generated meta information.

In accordance with another aspect of the present invention, a method of using rights information of a Digital Rights Management (DRM) agent is provided. The method includes, if contents corresponding to the rights information does not exist, determining whether contents information corresponding to the contents exist in the rights information, and if the contents information exists, obtaining the contents by using the contents information.

In accordance with another aspect of the present invention, a method of using rights information of a rights generator is provided. The method includes, if contents information corresponding to the rights information does not exist, adding the contents information to the rights information, and transmitting the rights information containing the contents information to a DRM agent.

In accordance with another aspect of the present invention, an apparatus of a DRM agent using rights information is provided. The apparatus includes a controller for determining whether contents information corresponding to the contents exist in the rights information if contents corresponding to the rights information does not exist, and for obtaining the contents by using the contents information if the contents information exists, and a Secure Removable Media (SRM) agent for storing the rights information.

In accordance with another aspect of the present invention, an apparatus of a right generator using rights information is provided. The apparatus includes a controller for adding the contents information to the rights information if contents information corresponding to the rights information does not exist, and for transmitting the rights information containing the contents information to a DRM agent.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention described below relates to an apparatus and method for determining contents information corresponding to a Rights Object (RO) in a mobile device and, more particularly, to an apparatus and method for transmitting information on contents together with the RO when the RO is moved from a mobile device to a memory card or a smart card (i.e., Device to SRM Move) or when the RO is moved from the memory card or the smart card to the mobile device (i.e., SRM to Device Move).

Figure 1:
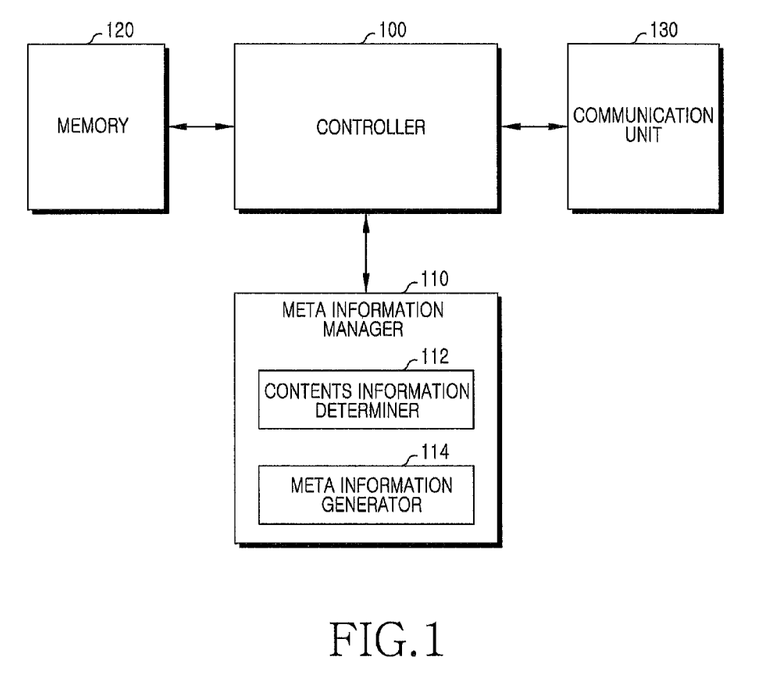
FIG. 1 is a block diagram illustrating a structure of a mobile device for transmitting additional information on contents when a Rights Object (RO) is transmitted according to an exemplary embodiment of the present invention.

FIG. 1 is a block diagram illustrating a structure of a mobile device for transmitting additional information on contents when an RO is transmitted according to an exemplary embodiment of the present invention.

The mobile device includes the concept of a portable device (i.e., a Digital Rights Management (DRM) agent) capable of moving the RO and a portable storage device (i.e., a Secure Removable Media (SRM) agent) for storing the RO. The mobile device may include a controller 100, a meta information manager 110, a memory 120, and a communication unit 130.

The controller 100 provides overall control to the mobile device. For example, the controller 100 processes an operation of the mobile device, transmits an RO of the mobile device to the portable storage device, or receives and stores an RO of the portable storage device. In addition thereto, when the RO of the mobile device is transmitted to the portable storage device, the controller 100 instructs the meta information manager 110 to generate meta information containing information on contents corresponding to the RO. Then, the meta information generated by the meta information manager 110 is transmitted to the portable storage device under the control of the controller 100.

Further, when an RO request is received, the controller 100 instructs the meta information manager 110 to obtain information on contents by using a Contents IDentifier (CID)

corresponding to the RO. The meta information contains a Uniform Resource Locator (URL) of contents, a contents format, author information, etc.

The meta information manager 110 may include a contents information determiner 112 and a meta information generator 114. Accordingly, the meta information manager 110 determines information on contents corresponding to an RO under the control of the controller 100, and generates meta information containing the determined contents information.

The meta information manager 110 instructs the contents information determiner 112 to determine the information on contents corresponding to the RO, and instructs the meta information generator 114 to generate meta information by using the contents information determined by the contents information determiner 112.

The meta information generator 114 may generate the meta information by adding the contents information to an AssetID defined in an Open Mobile Alliance (OMA) SRM spec or generate the meta information by using a scheme in which an existing SRM protocol is extended by adding the contents information according to extensibility of a binary message format on the OMA SRM spec. That is, in the present invention, to add a data type undefined in the conventional SRM standard, a space for storing the meta information is allocated to the AssetID defined on the message field of the appendix c.2 of the OMA SRM spec.

The memory 120 includes a Read Only Memory (ROM), a Random Access Memory (RAM), and a flash ROM. The ROM stores a microcode of a program by which the controller 100 and the meta information manager 110 are processed and controlled and a variety of reference data.

The RAM is a working memory of the controller 100 and stores temporary data that is generated while programs are performed.

The communication unit 130 transmits and receives messages for moving an RO to be consumed when contents are used between mobile devices, i.e., between a portable device (i.e., a DRM agent) capable of moving the RO and a portable storage device (i.e., an SRM agent) for storing the RO. More specifically, the communication unit 130 transmits or receives information on contents together with the RO. Further, in addition to the information provided in the present invention, the communication unit 130 may transmit and receive messages for a communication link between the mobile devices.

Although the operation of the meta information manager 110 may be performed by the controller 100, this is for exemplary purposes only, and thus the present invention is not limited thereto. Therefore, it will be understood by those skilled in the art that various changes in form and details may be made therein without departing from the spirit and scope of the present invention. For example, all operations described up to now may be processed by the controller 100.

An apparatus for determining contents information corresponding to an RO in a mobile device has been described above. In this apparatus, information on contents is transmitted together with the RO when the RO is moved from the mobile device to a memory card or a smart card or when the RO is moved from the memory card or the smart card to the mobile device. Hereinafter, a method of transmitting information on contents together with the RO when an RO is moved using the aforementioned apparatus will be described according to an exemplary embodiment of the present invention.

Figure 2:
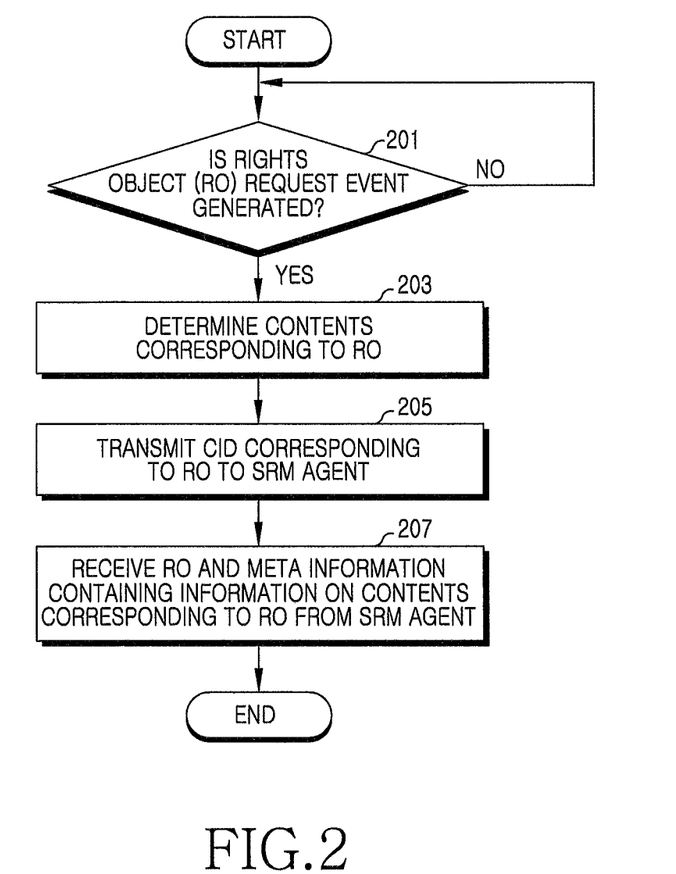
FIG. 2 is a flowchart illustrating a process of requesting an RO in a mobile device according to an exemplary embodiment of the present invention.

FIG. 2 is a flowchart illustrating a process of requesting an RO in a mobile device according to an exemplary embodiment of the present invention. The mobile device is an entity for requesting the RO according to the exemplary embodiment of the present invention. The process of FIG. 2 can also apply when the RO is requested from a portable storage device to another device.

Referring to FIG. 2, the mobile device determines whether an RO request event is generated in step 201. The RO request event is generated to move an RO stored in a memory card or a smart card from the mobile device or to move the RO from the memory card or the smart card to the mobile device. The RO request is requested from a portable storage device (i.e., an SRM agent) to a portable device (i.e., a DRM agent).

If it is determined that the RO request event is not generated, the process of step 201 is repeated.

If it is determined that the RO request event is generated, proceeding to step 203, the mobile device determines a CID corresponding to the RO.

In step 205, the mobile device transmits the CID corresponding to the RO to the SRM agent. In step 207, the mobile device receives the requested RO and meta information containing information on contents from the SRM agent.

Thereafter, the procedure of FIG. 2 ends.

Figure 3:
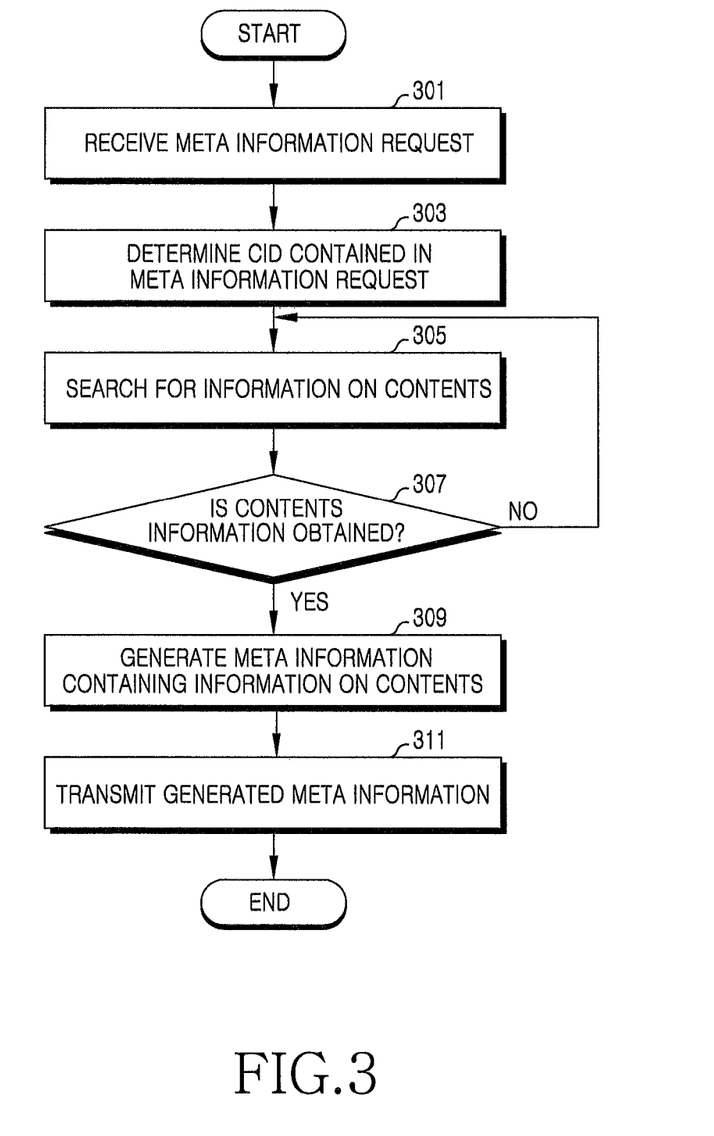
FIG. 3 is a flowchart illustrating a process of transmitting an RO from a mobile device to a portable storage device according to an exemplary embodiment of the present invention.

FIG. 3 is a flowchart illustrating a process of transmitting an RO from a mobile device to a portable storage device according to an exemplary embodiment of the present invention. The mobile device is an entity for transmitting the RO according to the exemplary embodiment of the present invention. The process of FIG. 3 can also apply when the RO is transmitted from the portable storage device to another device, and corresponds to the process of FIG. 2.

Referring to FIG. 3, the mobile device receives a meta information request in step 301. The meta information request is requested by a portable device (i.e., a DRM agent) from a portable storage device (i.e., an SRM agent). The mobile device determines a CID contained in the meta information request in step 303, and searches for information on contents corresponding to the CID in step 305.

The mobile device may allow the meta information manager 110 to obtain the information on contents by using the CID.

In step 307, the mobile device determines whether the obtaining of the information on contents is complete.

If the obtaining of the information on contents is not complete, the process of step 305 is repeated.

Otherwise, if the obtaining of the information on contents is complete, proceeding to step 309, the mobile device allows the meta information manager 110 to generate meta information containing the information on contents. Then, in step 311, the meta information generated by the meta information manager 110 is transmitted together with the RO to the DRM agent that requested the meta information.

The mobile device may generate the meta information by adding the contents information to an AssetID defined in an OMA SRM spec or generate the meta information using a scheme in which an existing SRM protocol is extended by adding the contents information according to extensibility of a binary message format on the OMA SRM spec.

Thereafter, the procedure of FIG. 3 ends.

Figure 4:
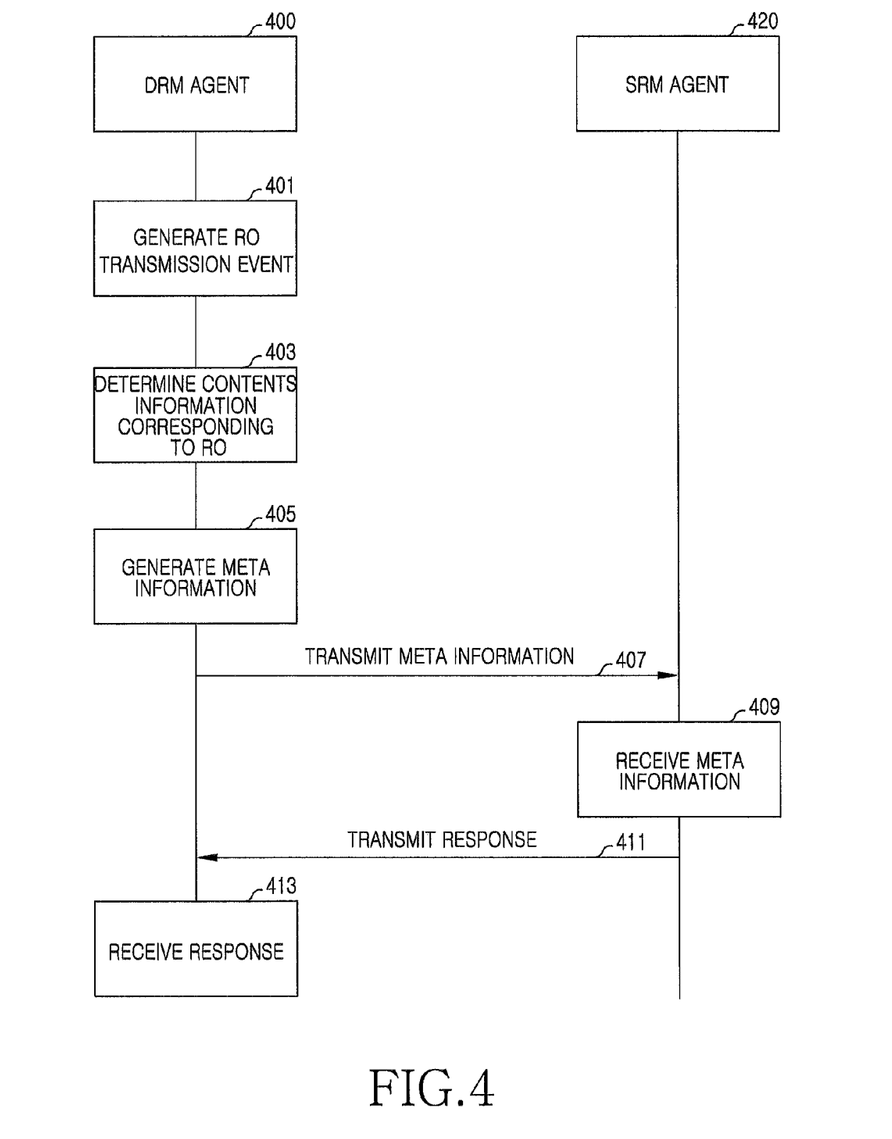
FIG. 4 illustrates a process of transmitting contents information together with the transmission of an RO according to an exemplary embodiment of the present invention.

FIG. 4 illustrates a process of transmitting contents information together with the transmission of an RO according to an exemplary embodiment of the present invention.

Referring to FIG. 4, a mobile device of the present invention includes a portable device 400 (i.e., a DRM agent) capable of moving the RO and a portable storage device 420 (i.e., an SRM agent) for storing the RO.

When an RO transmission event is generated in the portable device 400 capable of moving the RO (step 401), the portable device 400 determines contents information corresponding to the RO to be transmitted (step 403). The contents information determined by the portable device 400 may be a URL of contents, a contents format, author information, etc.

Thereafter, the portable device 400 generates meta information by using the determined contents information (step 405). The meta information contains the contents information.

After generating the meta information, the portable device 400 transmits the generated meta information to the portable storage device 420 for storing the RO (step 407). Then, the portable storage device 420 receives the meta information (step 409), and stores the meta information.

Thereafter, the portable storage device 420 for storing the RO transmits a response for reporting reception of the meta information to the portable device 400 that transmitted the RO (step 411), and the portable device 400 receives the response (step 413). Then, the procedure of FIG. 4 ends.

Figure 5:
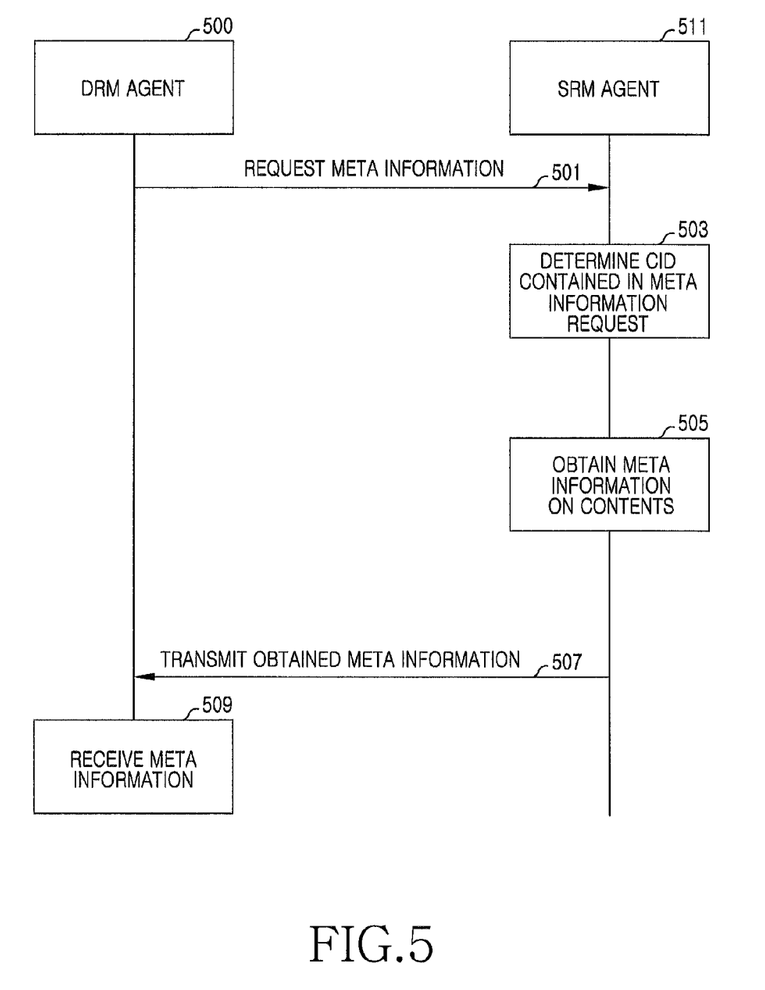
FIG. 5 illustrates a process of providing contents information when an RO is requested according to another exemplary embodiment of the present invention.

FIG. 5 illustrates a process of providing contents information when an RO is requested according to another exemplary embodiment of the present invention.

Referring to FIG. 5, a mobile device of the present invention includes a portable device 500 (i.e., a DRM agent) capable of moving the RO and a portable storage device 511 (i.e., an SRM agent) for storing the RO.

When an RO request event is generated in the portable device 500 capable of moving the RO, meta information is requested from the portable storage device 511 for storing the RO (step 501).

Upon receiving the meta information request, the portable storage device 511 determines a CID contained in the meta information request (step 503), and then obtains meta information containing information on contents (step 505). That is, the portable storage device 511 determines contents corresponding to the RO by using the CID, and then obtains the meta information by obtaining the information on contents.

Thereafter, the portable storage device 511 transmits the obtained meta information to the portable device 500 that requested the RO (step 507), and the portable device 500 receives the meta information transmitted by the portable storage device 511 (step 509), and stores the meta information.

In the OMA SRM standard, rights information may be moved and used by being separated from contents. Therefore, when the rights information is used alone, it is difficult to manage the contents by using only current rights information.

If meta information and a URL of contents are contained in the rights information, information on contents can be obtained at a later time by using only the rights information. Therefore, even if the rights information is separately preserved or provided to another user, user convenience can be achieved.

In addition, in a case where rights of contents are completely consumed, if required by a user, the contents can be obtained again as long as rights information having a relatively small size is preserved without having to preserve the contents to be used again.

The rights information contains rights meta data, a rights object container, state information, and a Rights Encryption Key (REK), and is configured as shown in Table 1 below.

TABLE 1

Rights Meta Data
Rights Object Container
State Information
REK

Among the above items, the rights meta data is added to meta information corresponding to the contents, such as a URL for accessing the contents, a contents title, a format, etc., as shown in Table 2 below.

TABLE 2

Rights Object Version
RO Alias
RI Identifier
RI URL
RI Alias
RI Time Stamp
Content URL
Content Title
Content Format Conventionally, the rights object container has only CID information. However, the present invention adds additional information regarding rights information containing the contents URL to the rights meta data. Therefore, more amount of information can be searched for, and the contents can be loaded by using contents related information contained in the rights meta data without having to perform complex parsing on an RO.

As such, independent rights information containing the contents related information may be separately preserved by a user or may be provided to another user. Afterwards, the user can determine and manage information on contents contained in the rights information and, if necessary, can use the contents again by using the URL.

Figure 6:
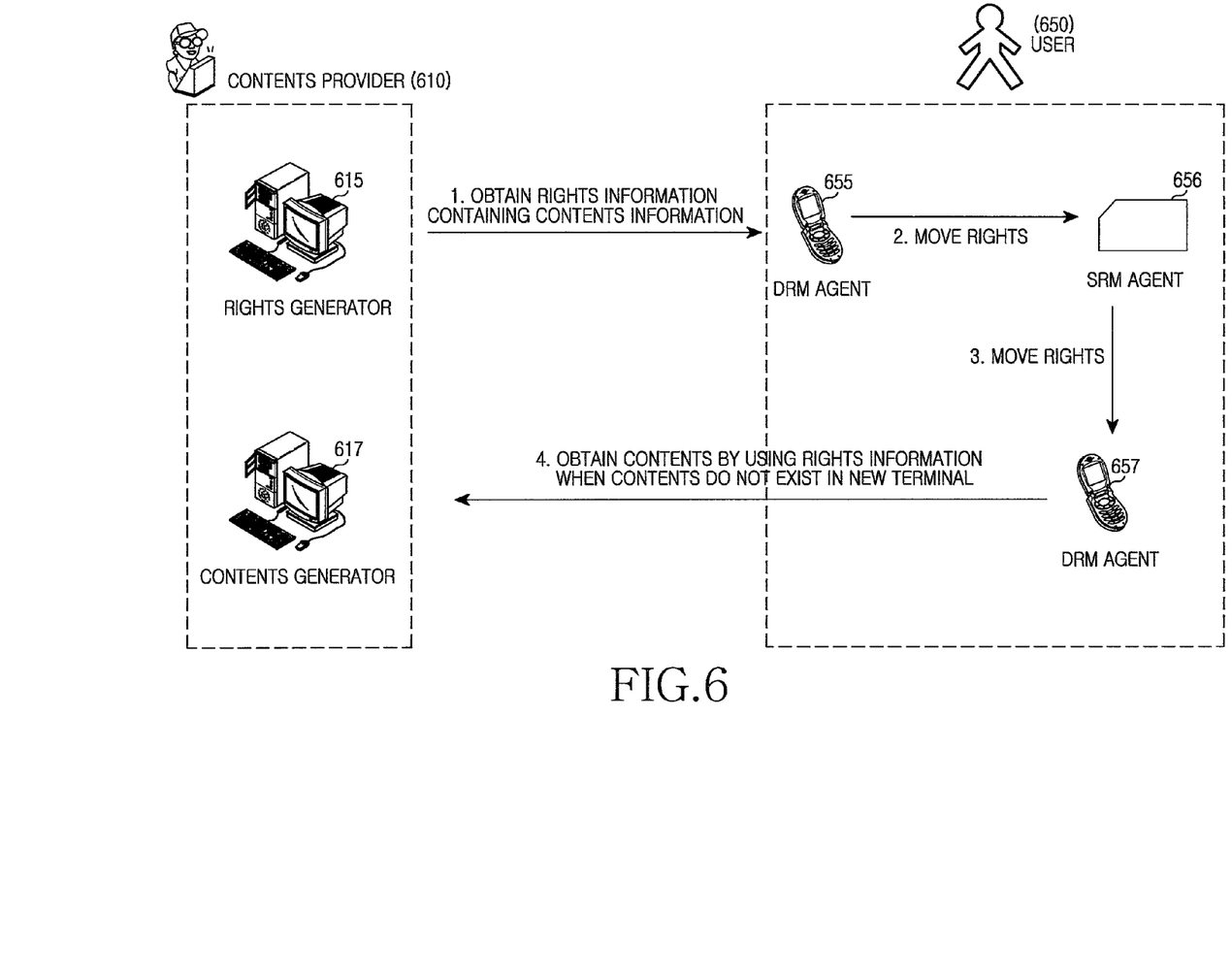
FIG. 6 illustrates a process of moving rights and obtaining contents according to another exemplary embodiment of the present invention.

FIG. 6 illustrates a process of moving rights and obtaining contents according to another exemplary embodiment of the present invention.

Referring to FIG. 6, when a DRM agent 655 is used, a user 650 obtains contents and rights information containing contents information from a contents provider 610 (step 1). The contents provider 610 includes a rights generator 615 and a contents generator 617.

The obtained rights information may be stored in a portable memory included in the DRM agent 655, and the portable memory will be referred to as an SRM agent 656 in the present invention. Thereafter, the user 650 may use the contents.

The user 650 changes a device currently in use to a different terminal or a different DRM agent 657, and installs the SRM agent 656 into the different terminal or the different DRM agent 657 (steps 2 and 3).

If the contents do not exist in the different terminal or the different DRM agent 657, the user 650 can obtain and use the contents by using the rights information stored in the SRM agent 656 (step 4).

Figure 7:
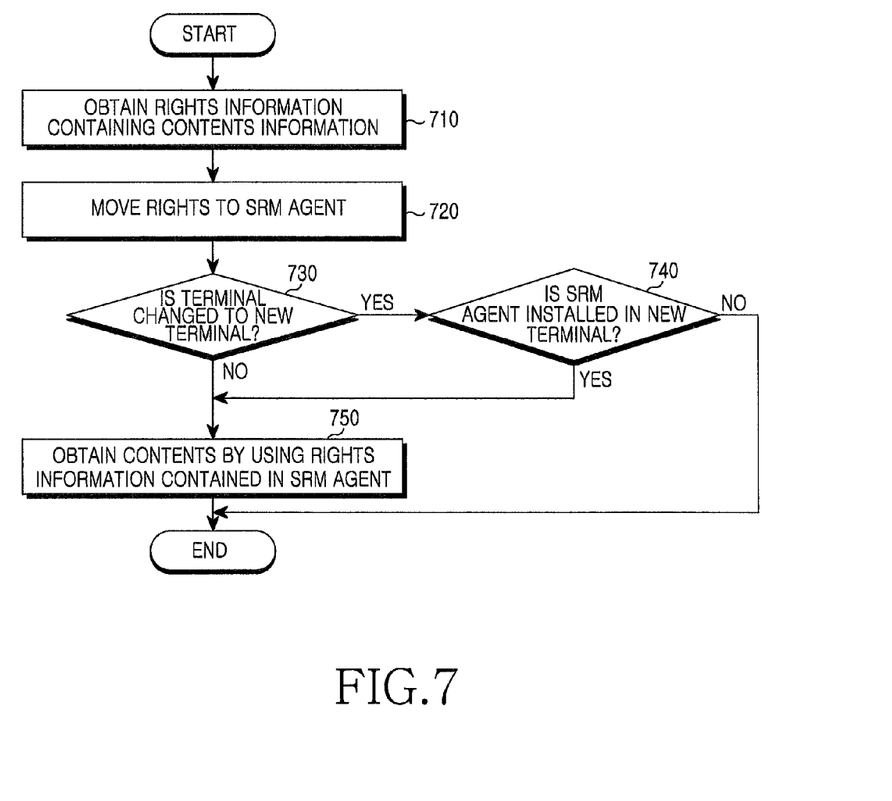
FIG. 7 is a flowchart illustrating a process of moving rights and obtaining contents according to another exemplary embodiment of the present invention.

FIG. 7 is a flowchart illustrating a process of moving rights and obtaining contents according to another exemplary embodiment of the present invention.

Referring to FIG. 7, when a DRM agent is used, a user obtains contents and rights information containing contents information from a contents provider (step 710). The contents provider includes a rights generator and a contents generator.

The obtained rights information is moved to a portable memory included in the DRM agent (step 720). That is, the obtained rights information can be stored in the portable memory.

If the user changes a device currently in use to a different terminal or a different DRM agent (step 730) and if the user installs the SRM agent in the different terminal or the different DRM agent (step 740), then the user can obtain and use the contents by using the rights information stored in the SRM agent (step 750).

The contents may be obtained by determining rights meta information in which rights information containing a contents URL is additionally included. Accordingly, the conventional problem can be solved in which information on contents cannot be determined by using CID information in a rights object container.

If the user does not change the device currently in use to the different terminal or the different DRM agent (step 730), the user may use stored contents, or can obtain and use the contents by using rights information stored in the SRM agent (step 750).

Figure 8:
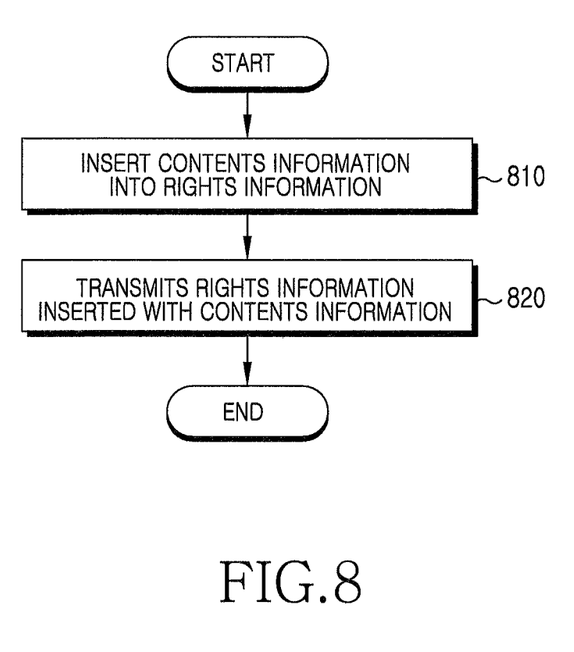
FIG. 8 is a flowchart illustrating an operation of a contents provider according to another exemplary embodiment of the present invention.

FIG. 8 is a flowchart illustrating an operation of a contents provider according to another exemplary embodiment of the present invention.

Referring to FIG. 8, the contents provider inserts the aforementioned contents information into rights information (step 810). Thereafter, the rights information inserted with the contents information is transmitted to a DRM agent or a terminal (step 820). That is, the contents provider adds rights information containing a contents URL to rights meta data and transmits the resultant information to the DRM agent or the terminal.

Figure 9:
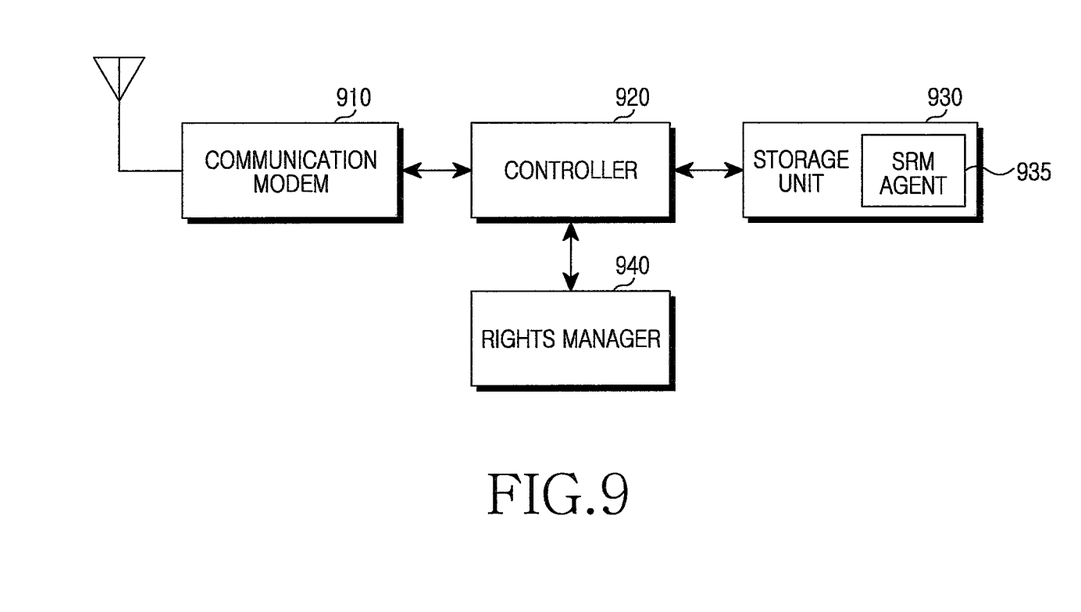
FIG. 9 is a block diagram illustrating a structure of a terminal or a Digital Rights Management (DRM) agent according to another exemplary embodiment of the present invention.

FIG. 9 is a block diagram illustrating a structure of a terminal or a DRM agent according to another exemplary embodiment of the present invention.

Referring to FIG. 9, the terminal or the DRM agent includes a communication modem 910, a controller 920, a storage unit 930, and a rights manager 940.

The communication modem 910 is a module for communicating with another node, and includes a wireless processor and a baseband processor. The wireless processor converts a signal received through an antenna into a baseband signal and then provides the baseband signal to the baseband processor. Further, the wireless processor converts a baseband signal received from the baseband processor into a wireless signal that can be transmitted on an actual wireless path and then transmits the wireless signal through the antenna.

The controller 920 provides overall control of the terminal or the DRM agent. In particular, the controller 920 controls the rights manager 940.

The storage unit 930 stores a program for controlling overall operations of the device and also stores temporary data that is generated while the program is performed. Further, the storage unit 930 includes an SRM agent 935.

The rights manager 940 obtains contents and rights information containing contents information from a contents provider. The rights manager 940 may obtain the contents by determining rights meta data in which rights information containing a contents URL is additionally included. The contents provider includes a rights generator and a contents generator. The obtained rights information can be moved and stored in the SRM agent 935 of the storage unit 930 in the DRM agent.

When a user changes a device currently in use to a different terminal or a different DRM agent and installs the SRM agent 935 in the different terminal or the different DRM agent, a rights manager of the different terminal or the different DRM agent can obtain and use contents by using rights information stored in the SRM agent 935.

In the aforementioned structure, the controller 920 can perform a function of the rights manager 940. Although they are constructed as different functional blocks in the present invention, this is for exemplary purposes only.

Therefore, when a product is implemented in practice, the function of the rights manager 940 may be either entirely or partially processed by the controller 920.

Figure 10:
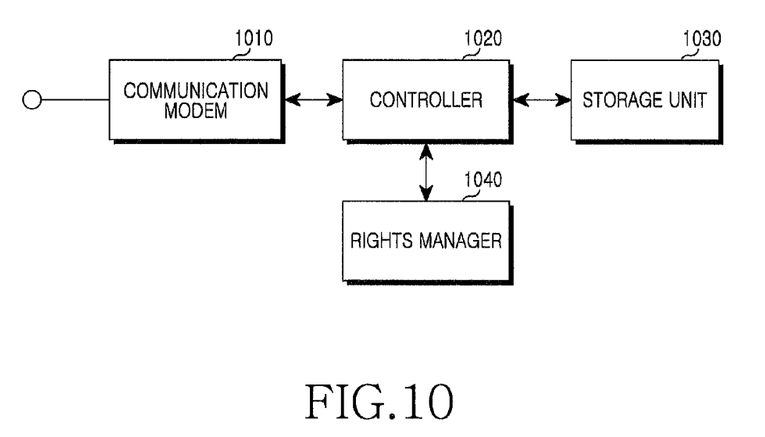
FIG. 10 is a block diagram illustrating a structure of a rights generator of a contents provider according to another exemplary embodiment of the present invention.

FIG. 10 is a block diagram illustrating a structure of a rights generator of a contents provider according to another exemplary embodiment of the present invention.

Referring to FIG. 10, the rights generator includes a communication modem 1010, a controller 1020, a storage unit 1030, and a rights manager 1040.

The communication modem 1010 is a module for communicating with another node, and includes a wired processor and a baseband processor. The wired processor converts a signal received through a wired path into a baseband signal and provides the baseband signal to the baseband processor. Further, the wired processor converts a baseband signal received from the baseband processor into a wired signal that can be transmitted on an actual wired path and transmits the wired signal through the wired path.

The controller 1020 provides overall control of the rights generator. In particular, the controller 1020 controls the rights manager 1040.

The storage unit 1030 stores a program for controlling overall operations of the device and also stores temporary data that is generated while the program is performed. Further, the storage unit 1030 stores rights information.

The rights manager 1040 inserts the aforementioned contents information into rights information to be transmitted to a terminal, and transmits the rights information inserted with the contents information to a DRM agent or the terminal. In this case, the rights manager 1040 adds rights information containing a contents URL to rights meta data.

In the aforementioned structure, the controller 1020 can perform a function of the rights manager 1040. Although they are configured as different functional blocks in the present invention, this is for exemplary purposes only.

Therefore, when a product is implemented in practice, the function of the rights manager 1040 may be either entirely or partially processed by the controller 1020.

As described above, in the present invention, information on contents is transmitted together with the RO when an RO is moved from a mobile device to a memory card or a smart card or when the RO is moved from the memory card or the smart card to the mobile device. Therefore, the conventional problem in which the information on contents cannot be determined by using a CID when the RO does not exist together with the contents (that is, when only the RO is moved to another storage medium) is solved.

In addition, the present invention has an advantage in that contents can be effectively managed and obtained by using rights information.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to provide contents information when a Rights Object (RO) is transmitted, the apparatus comprising:
    a portable storage device; and
    a controller configured to determine information about obtaining contents from a source of the contents when the Rights Object corresponding to the contents is moved without the contents, generate meta information including the information about obtaining the contents from the source of the contents, and control a transmission of the Rights Object and the meta information to the portable storage device.

2. The apparatus of claim 1, wherein the controller is further configured to determine the contents by using a Contents IDentifier (OD) contained in the Rights Object to be moved, and determine the information about obtaining the contents from the source of the contents corresponding to the determined contents.

3. The apparatus of claim 1, wherein the meta information is information containing at least one of a Uniform Resource Locator (URL) of the contents, a contents format, an author information, a contents title, or a Rights Object Version.

4. The apparatus of claim 1, wherein the portable storage device is configured to store the Rights Object and the meta information.

5. The apparatus of claim 1, wherein the controller is configured to generate the meta information by adding the contents information to an Asset ID defined in an Open Mobile Alliance (OMA) Secure Removable Media (SRM) specification or generate the meta information using a scheme in which an existing SRM protocol is extended by adding the contents information according to extensibility of a binary message format on the OMA SRM specification.

6. The apparatus of claim 1, wherein the meta information is included in rights meta information.

7. The apparatus of claim 6, wherein the controller is further configured to obtain the contents using the meta information included in the rights meta information.

8. A method in an electronic device for providing contents information when a Rights Object (RO) is transmitted, the method comprising:
    determining information about obtaining contents from a source of the contents when the Rights Object corresponding to the contents is moved without the contents;
    generating meta information including the information about obtaining the contents from the source of the contents; and
    controlling a transmission of the Rights Object and the meta information to a portable storage device.

9. The method of claim 8, further comprising:
    determining the contents by using a Contents IDentifier (CID) contained in the Rights Object to be moved, and determine the information about obtaining the contents from the source of the contents corresponding to the determined contents.

10. The method of claim 8, wherein the meta information is information containing at least one of a Uniform Resource Locator (URL) of the contents, a contents format, an author information, a contents title, or a Rights Object Version.

11. The method of claim 8, further comprising:
    storing the Rights Object and the meta information in the portable storage device.

12. The method of claim 8, wherein generating the meta information comprises generating the meta information by adding the contents information to an Asset ID defined in an Open Mobile Alliance (OMA) Secure Removable Media (SRM) specification or generate the meta information using a scheme in which an existing SRM protocol is extended by adding the contents information according to extensibility of a binary message format on the OMA SRM specification.

13. The method of claim 8, wherein the meta information is included in rights meta information.

14. The method of claim 13, further comprising obtaining the contents using the meta information included in the rights meta information.

15. A mobile device configured to provide contents information when a Rights Object (RO) is transmitted, the mobile device comprising:
    a storage unit; and
    a controller configured to determine information about obtaining contents from a source of the contents corresponding to the contents is moved without the contents, generate meta information including the information about obtaining the contents from the source of the contents, and control transmission of the Rights Object and the meta information to the mobile device.

16. The mobile device of claim 15, wherein the controller is further configured to determine the contents by using a Contents IDentifier (CID) contained in the Rights Object to be moved, and determine the information about obtaining the contents from the source of the contents corresponding to the determined contents.

17. The mobile device of claim 15, wherein the meta information is information containing at least one of a Uniform Resource Locator (URL) of the contents, a contents format, an author information, a contents title, or a Rights Object Version.

18. The mobile device of claim 15, wherein the storage unit is configured to store the Rights Object and the meta information.

19. The mobile device of claim 15, wherein the controller is configured to generate the meta information by adding the contents information to an Asset ID defined in an Open Mobile Alliance (OMA) Secure Removable Media (SRM) specification or generate the meta information using a scheme in which an existing SRM protocol is extended by adding the contents information according to extensibility of a binary message format on the OMA SRM specification.

20. The mobile device of claim 15, wherein the meta information is included in rights meta information and wherein the controller is further configured to obtain the contents using the meta information included in the rights meta information.

* * * * *